United States Patent
Lange

(10) Patent No.: US 7,461,900 B2
(45) Date of Patent: Dec. 9, 2008

(54) INCLINATION ADJUSTMENT FITTING FOR THE BACKREST OF A VEHICLE SEAT

(75) Inventor: Dieter Lange, Petershagen (DE)

(73) Assignee: Faurecia Autositze GmbH, Stadthagen (DE)

(*) Notice: Subject to any disclaimer, the term of this patent is extended or adjusted under 35 U.S.C. 154(b) by 1 day.

(21) Appl. No.: 11/592,966

(22) Filed: Nov. 6, 2006

(65) Prior Publication Data
US 2007/0108824 A1 May 17, 2007

(30) Foreign Application Priority Data
Nov. 5, 2005 (DE) .................. 10 2005 052 781

(51) Int. Cl.
*B60N 2/20* (2006.01)
*B60N 2/225* (2006.01)
*B60N 2/235* (2006.01)

(52) U.S. Cl. .................. 297/367; 297/362

(58) Field of Classification Search .................. 297/362, 297/367
See application file for complete search history.

(56) References Cited

U.S. PATENT DOCUMENTS

| | | | | |
|---|---|---|---|---|
| 5,871,414 A | * | 2/1999 | Voss et al. .................. | 475/175 |
| 6,619,743 B1 | * | 9/2003 | Scholz et al. .................. | 297/362 |
| 6,918,635 B2 | * | 7/2005 | Finner et al. .................. | 297/362 |
| 7,090,299 B2 | * | 8/2006 | Lange .................. | 297/362 |
| 7,172,253 B2 | | 2/2007 | Haverkamp | |
| 7,172,255 B2 | | 2/2007 | Wanke | |
| 7,273,243 B2 | | 9/2007 | Prugarewicz | |
| 7,278,689 B2 | * | 10/2007 | Guillouet .................. | 297/362 |
| 7,278,690 B2 | | 10/2007 | Bej | |
| 7,281,765 B2 | * | 10/2007 | Scholz et al. .................. | 297/362 |
| 7,390,061 B2 | * | 6/2008 | Lange .................. | 297/362 |
| 2003/0214165 A1 | * | 11/2003 | Finner et al. .................. | 297/326 |

(Continued)

FOREIGN PATENT DOCUMENTS

DE 199 38 666 B4 7/2004

(Continued)

OTHER PUBLICATIONS

German Office Action dated May 23, 2006 in German Application No. 10 2005 052 781.7, filed Nov. 5, 2005 (3 pages).

Primary Examiner—Rodney B. White
(74) Attorney, Agent, or Firm—Shlesinger, Arkwright & Garvey LLP

(57) ABSTRACT

Inclination adjustment fitting for backrest of a vehicle seat includes a fitting part affixable to vehicle seat, and a further fitting part affixable to a vehicle backrest, and which fitting parts pivot relative to one another around a pivoting axis, in use. Fitting parts include gearings providing part of a wobble gearing and rolling on one another under influence of an eccentric device rotatable around pivoting axis, and which includes an eccentric ring, on which wedge segments with end surfaces covering regions of the eccentric ring are provided. Rotating adjustment element is provided for the eccentric device and has an out-of-round recess for an actuating rod. Carrier elements and an additional carrier element are provided for connection of an eccentric ring with rotating adjustment element. The rotating adjustment element is guided in a radially movable manner on eccentric ring by the carrier elements and by the additional carrier element.

8 Claims, 4 Drawing Sheets

U.S. PATENT DOCUMENTS

| | | |
|---|---|---|
| 2004/0075404 A1 | 4/2004 | Gerding et al. |
| 2006/0061184 A1 | 3/2006 | Jennings |
| 2006/0108491 A1 | 5/2006 | Behrens |
| 2006/0138842 A1 | 6/2006 | Behrens |
| 2006/0175887 A1 | 8/2006 | Behrens |
| 2006/0214485 A1 | 9/2006 | Brockschneider et al. |
| 2006/0237986 A1 | 10/2006 | Brockschneider et al. |
| 2006/0261661 A1 | 11/2006 | Kraft et al. |
| 2006/0290187 A1* | 12/2006 | Scholz et al. ............... 297/362 |
| 2007/0013212 A1 | 1/2007 | Meister |
| 2007/0063565 A1 | 3/2007 | Habedank et al. |
| 2007/0069561 A1 | 3/2007 | Schnabel et al. |
| 2007/0080657 A1 | 4/2007 | Gerding et al. |
| 2008/0136241 A1* | 6/2008 | Stemmer et al. ............ 297/362 |
| 2008/0136242 A1* | 6/2008 | Stemmer et al. ............ 297/362 |

FOREIGN PATENT DOCUMENTS

| | | |
|---|---|---|
| DE | 10 2004 007 043 | 6/2005 |

* cited by examiner

INCLINATION ADJUSTMENT FITTING FOR THE BACKREST OF A VEHICLE SEAT

CROSS-REFERENCE TO RELATED APPLICATIONS

This application claims the priority of German application no. 10 2005 052 781.7, filed Nov. 5, 2005, and each of which is incorporated herein by reference.

FIELD OF THE INVENTION

The present invention relates to an inclination adjustment fitting for the backrest of a vehicle seat. More particularly, the present invention relates to an inclination adjustment fitting for the backrest of a vehicle seat that works substantially free of constraint; i.e., without constraining forces, such as friction and jamming.

BACKGROUND OF THE INVENTION

Inclination adjustment fittings of this type include internal and external gearing, which are produced by stamping metal sheet cutouts of the fitting parts. In this regard, the external gearing has at least one less tooth than the number of teeth in the internal gearing, and one of the fitting parts bears against an eccentric device that is capable of rotating around the pivoting axis of the inclination adjustment fitting, and which in turn bears against the other fitting part. The eccentric elements used in inclination adjustment fittings of this type are comprised of two wedge segments, which bear directly or indirectly against the one fitting part, and which are forced apart in a peripheral direction in the sense of an increase in eccentricity by means of a stored-energy device, generally a spring. In this manner, any play in the gearing and in the mounting is avoided. When the eccentric elements are actuated around the pivoting axis of the inclination adjustment fitting, the internal gearing of the one fitting part rolls on the external gearing of the other fitting part, which causes the fitting part that is affixed to the backrest to pivot relative to the fitting part that is affixed to the seat in a manner that corresponds to the difference in the number of teeth.

In DE 199 38 666 A1 an inclination adjustment fitting of this type is described. In this fitting, means for a fixed, interlocking connection of the eccentric ring with a torque inducing rotating adjustment element are provided between the narrow faces of the wedge segments. The means for the fixed connection are projections that are connected to the rotating adjustment element in a rigid manner and that engage in a recess of the eccentric ring in an interlocking manner. One disadvantage of this known fitting is the fact that the introduction of force from the rotating adjustment element into the eccentric ring can result in jamming in the actuating system, which in turn results in stiffness of the inclination adjustment fittings.

OBJECTS AND SUMMARY OF THE INVENTION

The object of the present invention is to provide an inclination adjustment fitting of this type, which works substantially works free of constraint; i.e., without constraining forces.

This object is attained according to the invention with an inclination adjustment fitting for the backrest of a vehicle seat that includes:

a) a fitting part affixable to a vehicle seat, in use, and a further fitting part affixable to a vehicle backrest, in use, and which fitting parts can be pivoted relative to one another around a pivoting axis, in use;

b) the fitting part and further fitting part include respective gearings which provide a part of a wobble gearing and roll on one another under the influence of an eccentric device which is rotatable around the pivoting axis, and which includes an eccentric ring, on which two wedge segments with a wide end surface and a narrow end surface that cover regions of the eccentric ring lie, arranged in a mirror image, and which segments are forced away from one another in the sense of an increase in eccentricity by a spring element that rests against the wide end surface of the wedge segments;

c) the eccentric device bears the fitting part, while the further fitting part bears the eccentric device;

d) a rotating adjustment element provided for the eccentric device and having an out-of-round recess for a fixed connection with an actuating rod;

e) carrier elements for the fixed connection of the eccentric ring with the rotating adjustment element being provided between narrow end surfaces of the wedge segments;

f) an additional carrier element being provided for a fixed connection of the eccentric ring with the rotating adjustment element is provided between wide end surfaces of the wedge segments; and g) the rotating adjustment element being guided in a radially movable manner on the eccentric ring by means of the carrier elements and by the additional carrier element.

According to the invention, an additional device or element for a fixed connection of the eccentric ring with the rotating adjustment element is provided between the two wide end surfaces of the wedge segments. This means there are two contact points in each direction of rotation between these two components that are radially displaceable in relation to one another when the eccentric ring is actuated by means of the rotating adjustment element. This causes the rotating adjustment element to center itself on the eccentric ring so that, in principle, it runs without jamming, in particular without friction, in the respective fitting, which is advantageous for easy operability of the inclination adjustment fitting.

Other advantageous embodiments of the invention are disclosed throughout. Below, the invention will be described in greater detail with reference to one exemplary embodiment.

Relative terms such as up, down, left, and right are for convenience only and are not intended to be limiting.

DETAILED DESCRIPTION OF THE INVENTION

Figure 1:
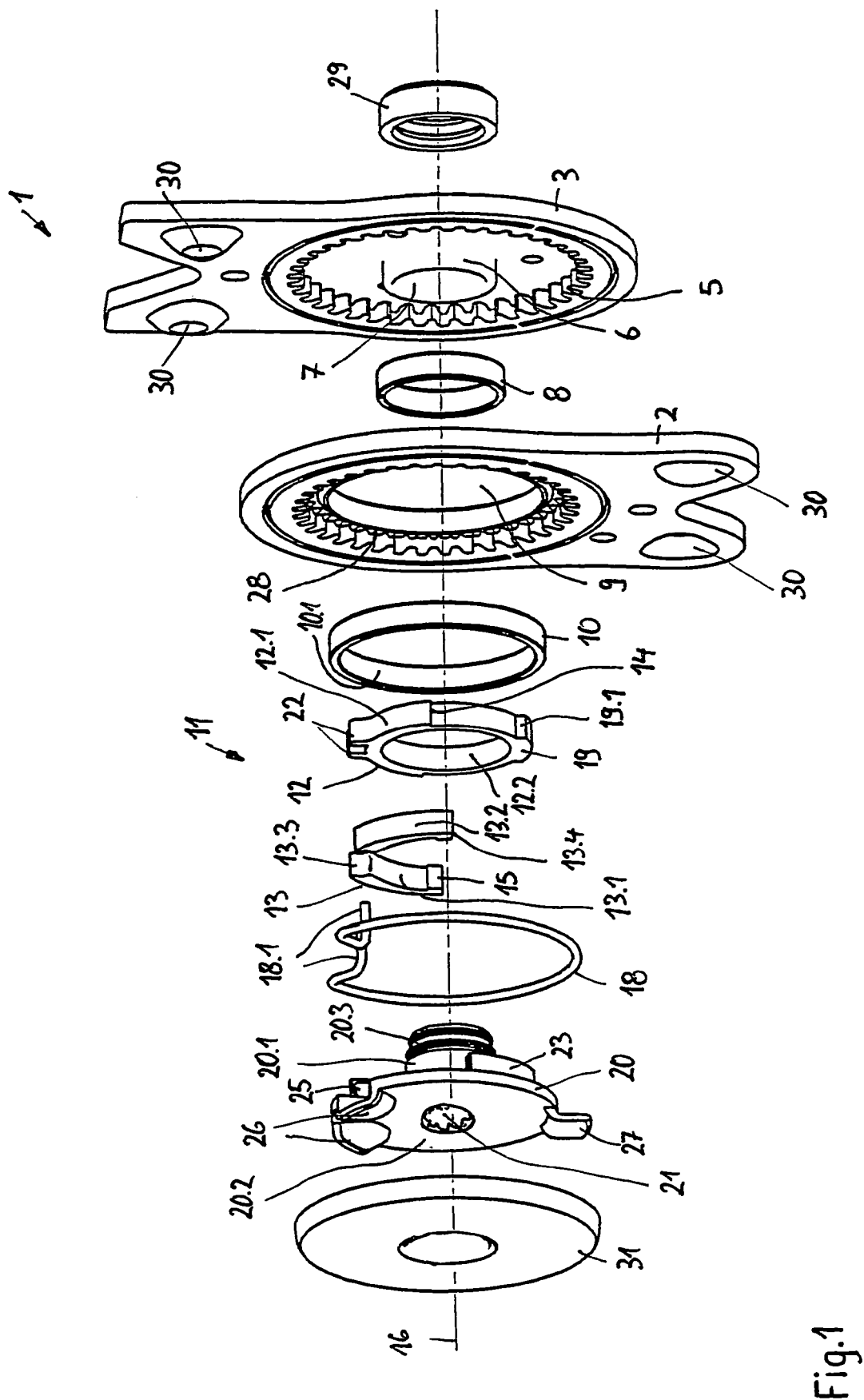
FIG. 1 shows the components of an inclination adjustment fitting of an embodiment of the invention, in an exploded, perspective representation.
Figure 2:
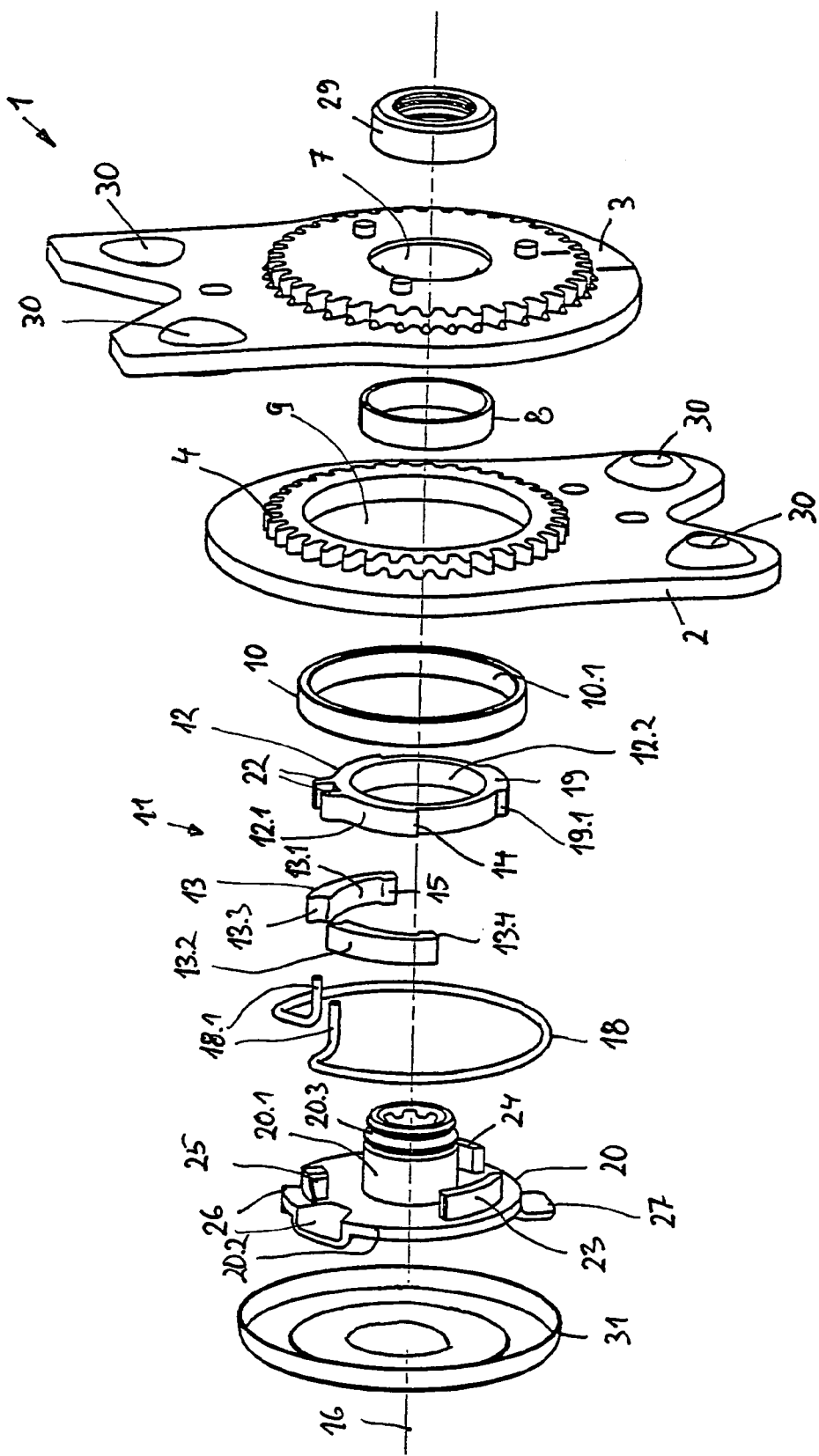
FIG. 2 shows a view of the embodiment of FIG. 1 from a different viewing angle.

An inclination adjustment fitting 1 depicted in the drawing is a component of a vehicle seat that is not shown here and that includes a seat component and a backrest component, wherein the inclination of the backrest component relative to the seat component can be adjusted by means of the inclination adjustment fitting 1. To this end, the inclination adjustment fitting 1 includes a fitting part or first fitting part 2 that is affixed to the seat component and a further or second fitting part 3 that is affixed to the backrest component. Both fitting parts 2, 3 are deep-drawn steel sheet blanks, wherein the fitting part 2 is equipped with external gearing 4 stamped out of the blank, and the further fitting part 3 is equipped with internal gearing 5 stamped out of the blank. The external gearing 4 has the same gear modulus as the internal gearing 5, but contains at least one less tooth. In the assembled inclination adjustment fitting 1, the external gearing 4 and the internal gearing 5 mesh with one another. The further fitting part 3 is further equipped with a rim hole 6 that has a circular through opening 7 and is concentric relative to the internal gearing 5. An inner bearing ring 8 can be slipped onto the rim hole 6. The fitting part 2 is also equipped with a circular through opening 9, provided concentrically relative to the external gearing 4, into which an outer bearing ring 10 can be inserted.

The bearing rings 8 and 10 serve as bearings for an eccentric device 11. This consists of an eccentric ring 12 and two identical wedge segments 13 that are provided on the ring in a mirror-image position. When the fitting is assembled, the eccentric ring 12 is pushed onto the inner bearing ring 8, the inner surfaces 13.1 of the wedge segments 13 rest on the outer surface 12.1 of the eccentric ring 12, and the outer surfaces 13.2 of the wedge segments 13 rest against the inner surface 10.1 of the outer bearing ring 10. This arrangement can be most clearly seen in the illustration according to FIG. 4. In order to avoid the presence of only one contact point between the inner bearing ring 8 and the inner surface 12.2 of the eccentric ring 12, which would result in a "wobbling" of the further fitting part 3 on the fitting part 2, the inner surface 12.2 of the eccentric ring 12 is out-of-round relative to the inner bearing ring 8, so that at least two contact points exist between these two components. The inner surfaces 13.1 of the wedge segments 13 also do not rest flat against the outer surfaces 12.1 of the eccentric ring 12. The mutual curvatures of the inner surfaces 13.1 and the outer surfaces 12.1 are designed such that linear contact is created between them. The outer surfaces 13.2 of the wedge segments 13, in contrast, have the same curvature as the inner surface 10.1 of the outer bearing ring 10. The wedge segments 13 thus lie flat against the outer bearing ring 10.

The outer surface 12.1 of the eccentric ring 12, which is covered by the wedge segments 13, tapers upward forming a wedge shape relative to its inner surface 12.2. The wall thickness of the eccentric ring 12, which is thereby increased, is used at the end of the upward taper to form a projection 14 having a stop surface 14.1 that is oriented radially outward, wherein this projection 14 is formed by a material offset to a smaller external dimension of the eccentric ring 12. Stop surfaces 15.1 are allocated to these stop surfaces 14.1 of the eccentric ring 12, positioned on a projection 15 that is oriented radially inward in the area of the narrow end surface 13.4 of the wedge segments 13. Between the stop surfaces 14.1 and 15.1, a gap exists when the eccentric device 11 is not actuated, which can best be seen in FIG. 4. As a result of the upward tapering of the outer surface 12.1 of the eccentric ring 12, the inner surfaces 13.1 of the wedge segments 13 are in contact with an opposing wedge surface. This opposing wedge design allows an optimal layout for the wedge angle of the wedge segments 13.

Symmetrically to the two projections 14 on the eccentric ring 12, a stop cam 19 with two stop surfaces 19.1 is formed on the area of the eccentric ring 12 that is free from the wedge segments 13, by means of an increase in the wall thickness of the eccentric ring 12. The eccentric ring 12 has two additional stop cams 22 that are diametrically opposite stop cam 19 and are spaced at a distance from one another wherein their respective faces that face each other also form stop surfaces 22.1. Stop surfaces 19.1 and 22.1 are parallel relative to one another and relative to the cross-section center axis 32 (FIG. 4).

Figure 4:
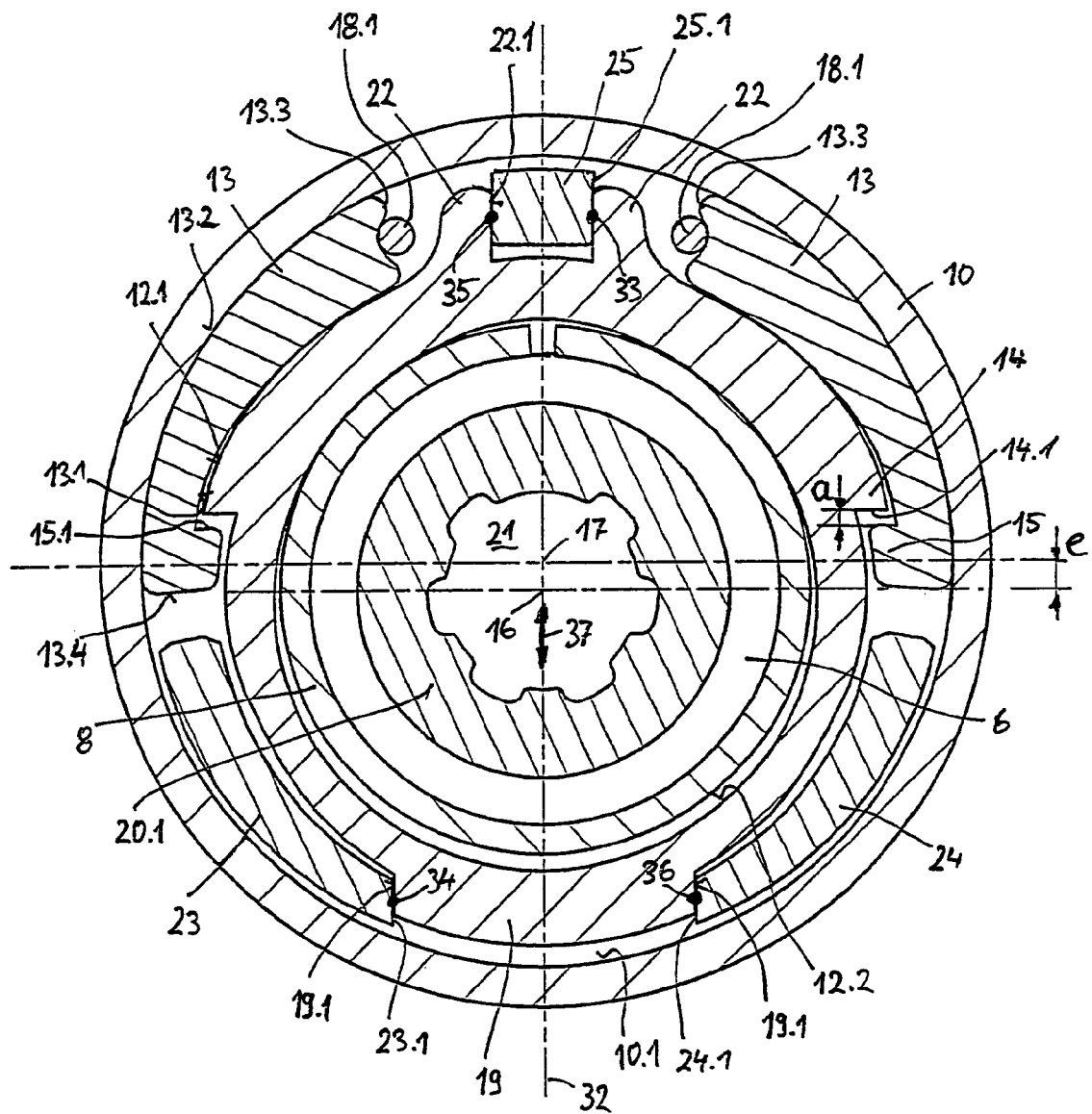
FIG. 4 shows a cross-sectional view of the illustration of the inventive inclination adjustment fitting according to FIG. 3.

By virtue of this insertion of the eccentric device 11 between the two fitting parts 2 and 3, an eccentricity e is created between the central axis of the through opening 7 of the fitting part 3, which forms the pivoting axis 16 of the inclination adjustment fitting 1, and the central axis 17 of the through opening 9 in the fitting part 2 (see FIG. 4). This eccentricity e ensures that the external gearing 4 is forced into the internal gearing 5 of the further fitting part 3 in an extension of the direction of the eccentricity e. In order to form this engagement of the external gearing 4 and the internal gearing 5, along with the bearing of the two fitting parts 2 and 3, without any play, the wedge segments 13 are acted upon by spring-loaded elements, such that they are forced away from one another peripherally on the eccentric ring 12 in the sense of an increase in eccentricity. In the present exemplary embodiment an omega spring 18 is provided as the spring-loaded element, whose legs 18.1, which are bent at right angles, bear against the end surfaces 13.3 of the wedge segments 13 that face one another, forcing the segments apart, as described.

The above-described arrangement ensures that the inclination adjustment fitting 1 is held in place, free from play, in each adjusted position of inclination of the backrest, because the forces exerted by the backrest are radially absorbed by the wedge segments 13, in other words no adjustment forces are exerted on them. The tension exerted by the omega spring 18 on the wedge segments 13 can be relieved only by peripheral forces acting on the wedge segments 13. In order to introduce this type of adjusting motion on the eccentric device 11, a rotating adjustment element 20 is provided that is described in greater detail below.

The rotating adjustment element 20 is comprised of one single piece and is made of glass fiber reinforced plastic. It has a cylindrical hub 20.1 which on one end has a discoid carrier 20.2 with a larger diameter and on its opposite end has two catch stages 20.3. The hub 20.1 furthermore has a central recess 21 with an out-of-round cross-section for accommodating in an interlocking manner an actuation or transmission rod, which is not shown, and which connects the inclination adjustment fitting 1 of both sides of the seat and is actuated by a motor-drive unit which is not shown either.

Figure 3:
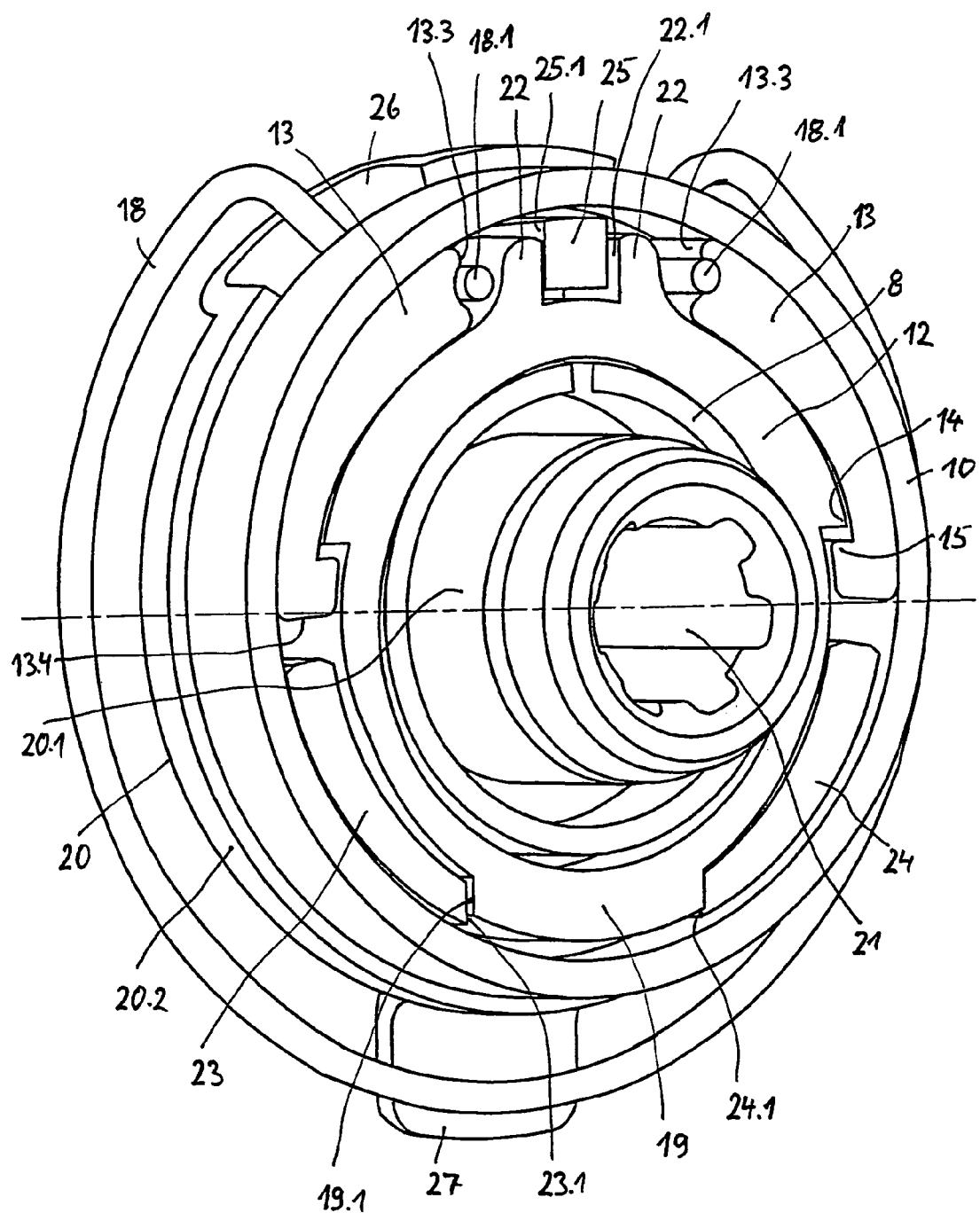
FIG. 3 shows a perspective view from laterally inside onto the mounted actuation and eccentric device of the inventive inclination adjustment fitting.

Three carrier fingers 23, 24, and 25 extend axially from the inside of the discoid carrier 20.2, whose function will be explained below. Two spring pockets 26 are provided on the outside of the carrier 20.2 and diametrically opposite them a stop projection 27 is provided, wherein the diameter of the latter is larger than that of the carrier 20.2. The spring pockets 26 and the stop projection 27 provide an abutment for the omega spring 14 when the inclination adjustment fitting 1 is assembled. This can best be seen in FIG. 3.

For assembly purposes the hub 20.1 of the rotating adjustment element 20 is pushed through the already assembled other components of the inclination adjustment fitting 1, so that it extends through the through opening 7 of the rim hole 6 of the further fitting part 3 with less radial play. The periphery of the inside of the carrier 20.2 then rests on a stage 28 (FIG. 1) that is formed by the stamping out of the external gearing 4 on the fitting part 2 while the other end of the hub 20.1 extends from the other side of the further fitting part 3 with the two catch stages 20.3. To fix the rotating adjustment element 20 in or respectively on the inclination adjustment fitting 1, a snap ring 29 is slipped over the end of the hub 20.1 that extends from the further fitting part 3, the snap ring 29 locking with the two catch stages 20.3 of the hub 20.1. In addition to the customary retaining sheet metal, such as steel, that is not shown in the drawing, this provides for an axial clamping of the two fitting parts 2 and 3. These retaining sheet metals are welded to the fitting parts 2 and 3 by means of weld projections 30 and cover some areas of the periphery of the internal gearing 5 or external gearing 4, respectively, of the respective other fitting 2 or 3.

The carrier fingers 23 and 24 have stop surfaces 23.1 and 24.1, respectively, that are provided in parallel relative to one another, and carrier finger 25 has two stop surfaces 25.1 that are parallel relative to one another and to stop surfaces 23.1 and 24.1. When the rotary adjustment element 20 is assembled, the carrier finger 25 extends between the two stop cams 22, wherein its stop surfaces 25.1 rest against the respective stop surfaces 22.1 of the stop cams 22. In radial direction, there is a "gap" between the stop cam 25 and the bearing ring 10 and the eccentric ring 12 (FIG. 4).

When the rotary adjustment element 20 is assembled, the carrier fingers 23 and 24 extend with a radial "gap" in both directions into a space between the eccentric ring 12 and the outer bearing ring 10 (FIG. 4). They take up the stop cam 19 between one another while their stop surfaces 23.1 and 24.1 rest against the respective stop surfaces 19.1 of the stop cam 19. This provides a fixed connection between the rotating adjustment element 20 and the eccentric ring 12 with two torque introduction locations 33 through 36 for each direction of rotation, i. e. based on the illustration shown in FIG. 4, locations 33 and 36 for clockwise direction and locations 35 and 34 for counterclockwise direction, with locations 33 through 36 only being indicated symbolically in FIG. 4. With the above it is understood that due to assembly reasons there is some tangential play between stop surfaces 23.1, 24.1, and 25.1 of the carrier fingers 23, 24, and 25 and the respective stop surfaces 19.1 and 22.1 of the stop cams 19 or 22, respectively. Due to the parallel alignment of the stop surfaces 19.1, 22.1, through 25.1 of the stop cams 19, 22 and the carrier fingers 23 through 25 relative to one another and the radial "gap" or "play" relative to the eccentric ring 12 and the outer bearing ring 10, the rotating adjustment element 20 is guided on the eccentric ring in a radially moveable manner, which is indicated symbolically in FIG. 4 by way of a double-headed arrow 37.

To complete the assembly, a cover 31 is attached axially to the fitting part 2 that covers the omega spring 18, the rotary adjustment element 20, and especially the open joint area of the inclination adjustment fitting 1 in order to protect it against dirt, especially during paint operations.

To operate the inclination adjustment fitting 1, a torque is transmitted to the rotary adjustment element 20 via the actuation rod that is actuated by means of the motor-drive unit and is fixed with the hub 20.1 of the rotating adjustment element 20, whose carrier fingers 23, 24, and 25 make the eccentric ring move in a rotational manner. Depending on the direction of rotation, they either introduce a torque into the eccentric ring 12 by means of the torque introduction locations 33, 36 or 35, 34. The wedge segment 13 which is in front in the rotational direction, initially stands still, which decreases the friction with the eccentric ring 12 and the bearing ring 10 and finally causes the respective projection 14 of the eccentric ring 12 to come in contact with the projection 15 of the respective wedge segment 13. The other wedge segment 13 is taken along due to the friction forces and alternates with the effect of the omega spring 18 that is in contact on its wide end surface 13.3, i.e. this wedge segment 13, too, is released so that there is radial play for adjusting the inclination adjustment fitting 1. When there is further actuation from the actuating rod, the wedge segments 13 together with the eccentric ring 12 rotate around the pivoting axis 16. Due to this rotation movement of the eccentric device 11, the direction of eccentricity e shifts and thus the engagement location of the external gearing 4 with the internal gearing 5. This means there is a wobbling movement of the external gearing 4 on the internal gearing 5 and the further fitting part 3 swivels on the fixed fitting part 2. As soon as the introduction of the torque into the inclination adjustment fitting 1 via the actuation rod is finished, the omega spring 18 pushes the wedge segments 13 back into their starting position, i.e. eccentricity e is increased again, which removes the radial play that is necessary for the adjustment movement and the backrest is fixed again.

The above paragraphs describe that each direction of rotation of the eccentric ring 12 has two torque introduction locations 33, 36 or 35, 34 respectively. FIG. 4 shows that these are almost optimally diametrically opposed. This arrangement of the torque introduction locations 33, 36 and 35, 34 as well as the radially mobile mounting of the rotating adjustment element 20 on the eccentric ring 12 cause the rotating adjustment element 20 to be centered on the eccentric ring 12 when the eccentric device 11 is turned so that its hub 20.1 is centered in the through opening 7 of the rim hole 6 of fitting part 3. This means the rotating adjustment element 20 in principle runs without friction in the further fitting part 3, which is advantageous for the smooth running of the inclination adjustment fitting 1.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Inclination adjustment fitting for the backrest of a vehicle seat, comprising:
   a) a first fitting part affixable to a vehicle seat, in use, and a second further fitting part affixable to a vehicle backrest, in use, and which first and second fitting parts can be pivoted relative to one another around a pivoting axis, in use;
   b) the first fitting part and the second fitting part include respective gearings which provide a part of a wobble gearing and roll on one another under the influence of an eccentric device which is rotatable around the pivoting axis, and which includes an eccentric ring, on which two wedge segments with a wide end surface and a narrow end surface that cover regions of the eccentric ring lie, arranged in a mirror image, and which wedge segments are forced away from one another in the sense of an increase in eccentricity by a spring element that rests against the wide end surface of the wedge segments;
   c) the eccentric device bears the first fitting part, while the second fitting part bears the eccentric device;

d) a rotating adjustment element provided for the eccentric device and having an irregular recess for a fixed connection with an actuating rod;

e) carrier elements for the fixed connection of the eccentric ring with the rotating adjustment element being provided between narrow end surfaces of the wedge segments;

f) an additional carrier element being provided for a fixed connection of the eccentric ring with the rotating adjustment element is provided between wide end surfaces of the wedge segments; and g) the rotating adjustment element being guided in a radially movable manner on the eccentric ring by means of the carrier elements and by the additional carrier element.

2. Inclination adjustment fitting according to claim 1, wherein:

a) the carrier elements and the additional carrier element are arranged substantially diametrically relative to one another on the rotating adjustment element.

3. Inclination adjustment fitting according to claim 2, wherein:

a) stop cams including radial projections are provided on the eccentric ring, the stop cams including stop surfaces for a fixed transport of the eccentric ring by the carrier elements and by the additional carrier element that likewise include respective stop surfaces.

4. Inclination adjustment fitting according to claim 3, wherein:

a) the respective stop surfaces are parallel relative to one another.

5. Inclination adjustment fitting according to claim 4, wherein:

a) the carrier elements accommodate the stop cams between one another.

6. Inclination adjustment fitting according to claim 3, wherein:

a) the carrier elements accommodate the stop cams between one another.

7. Inclination adjustment fitting according to claim 3, wherein:

a) the additional carrier element engages with the stop cams.

8. Inclination adjustment fitting according to claim 1, wherein:

a) stop cams including radial projections are provided on the eccentric ring, the stop cams including stop surfaces for a fixed transport of the eccentric ring by the carrier elements and by the additional carrier element that likewise include respective stop surfaces.

* * * * *